Aug. 18, 1970      A. R. SAYRES      3,524,985
COMPOSITE SOLID STATE RADIATION DETECTOR
Filed Aug. 8, 1967                   7 Sheets-Sheet 1

INVENTOR
Alden R. Sayres

BY Stevens, Davis, Miller & Mosher
ATTORNEYS

Fig. 9

INVENTOR
Alden R. Sayres

Fig. 10

3,524,985
COMPOSITE SOLID STATE RADIATION
DETECTOR
Alden R. Sayres, Jersey City, N.J., assignor to Princeton
Gamma-Tech, Inc., Newark, N.J., a corporation of
New Jersey
Filed Aug. 8, 1967, Ser. No. 659,121
Int. Cl. G01t 1/24
U.S. Cl. 250—83.3                                18 Claims

ABSTRACT OF THE DISCLOSURE

Apparatus, system and method comprising or utilizing a physical plurality of solid state radiation detectors variously electronically connected in coincidence mode and a single crystal solid state radiation detector itself electronically sub-divided into a plurality of solid state radiation detectors in coincidence mode.

BACKGROUND OF THE INVENTION

Field of the invention

The present invention generally relates to composite solid state radiation detectors, and, more particularly, the present invention relates to apparatus, system and method comprising or utilizing a physical plurality of solid state radiation detectors variously electronically connected in coincidence mode and a single crystal solid state radiation detector itself electronically sub-divided into a plurality of solid state radiation detectors in coincidence mode. The invention likewise relates to a physical plurality of said electronically sub-divided single crystal radiation detectors, with distinct single crystals themselves being electronically connected in coincidence mode; and to a combination of the aforesaid detectors.

Description of the prior art

It is known in the art to use semiconductor devices embodying a reversed biased P-I-N structure for the detection of gamma rays. One such structure is made of germanium which has been subjected to a "lithium drift process" [see, for example, Pell, U.S. Pat. No. 2,957,789, or E. M. Pell, J. Applied Physics, 31, 291 (1960)].

The so-called lithium-drifted germanium detector is a solid state ionization device. These devices are prepared in many laboratories by well known techniques. Compare J. H. Elliott, Nuclear Instr. & Meth., 12, 60–66 (1961); W. L. Hansen & B. V. Jarret, Nuclear Instr. & Meth., 31, 301 (1964); G. Dearnaley & D. C. Northrop, Semiconductor Detectors for Nuclear Radiation, Wiley, N.Y. (1963); and G. L. Miller et al., IEEE Trans. Nuclear Sci., NS-10, No. 1, 220 (1963).

In operation such devices are exposed to gamma radiation and absorption or scattering of the gamma rays within the intrinsic region produces high-speed electrons which lose their energy by creating free-charge carriers (electron-hole pairs). These carriers are collected by impressing a voltage gradient of the order of 50–200 volt/mm. across the intrinsic region and integrating and amplifying the resultant current. The observed charge spectrum is suitably amplified and then generally recorded using a differential pulse height analyzer (pulse height analyzers are well known, being manufactured, for example, by Nuclear-Chicago Corp., Des Plaines, Ill., and Nuclear Data, Inc., Palatine, Ill., and others). The observed charged spectrum consists of a continuum and one or more narrow peaks from which one can infer the energy spectrum of the incident gamma-ray flux. The areas under the peaks are a function of the detector size and shape, the position off the source with respect to the detector, and the photon energy.

Insofar as the interaction of gamma rays with the lithium-drifted germanium [Ge(Li)] detector is concerned, the major features of the differential pulse-height spectrum are directly related to the three primary processes in which incident photons give up all or part of their energy in single events. These three are: photoelectric effect, Compton scattering, and pair production. Contributions to the full energy peak may also arise from photoelectric encounters by the gamma rays following one or more Compton scatterings within the detector.

In a photoelectric encounter, the entire photon energy is absorbed by a bound atomic electron and appears as (1) the kinetic energy of that electron as it is ejected and (2) an X-ray or Auger electron emitted by the residual ion. The low-energy X-ray is almost invariably absorbed in a second photoelectric event before it can escape from the crystal. As a result, the total photon energy appears as electron kinetic energy. For the photoelectric effect, a monoenergetic gamma ray thus gives rise to a monoenergetic peak in the charge distribution corresponding to the incident photon energy, $E_\gamma$.

In Compton scattering, the photon is scattered by an electron with a partial energy loss dependent on the angle of scattering. The electron kinetic energy lies between zero and an upper energy limit which depends on the photon energy. The scattering gives rise to a continuous electron-energy distribution between these limits.

The previously mentioned processes, while energy dependent in probability, are possible for all energies. Pair production has an energetic threshold equal to the combined position-electron rest mass (1.022 mev.). The entire photon energy is absorbed and appears as the total kinetic energy of the positron-electron pair ($E_\gamma$—1.022 mev.) plus the rest mass of the pair. The positron is unstable and will anihilate with an atomic electron, usually when it has come to rest. In such a case, the annihilation produces two photons of energy 0.511 mev. each emitted at 180° to each other. In the usual encounter, both annihilation photons will escape. Then, a monoenergetic gamma ray gives rise to a monoenergetic electron distribution of energy $E_\gamma$—1.022 mev. Satellite peaks may appear if the detector is sufficiently large. These correspond to the detection of one or both annihilation photons in photoelectric encounters. Ultimately, three peaks are seen: one at $E_\gamma$—1.022 mev., corresponding to the escape of both photons (2-escape), one at $E_\gamma$—511 kev., corresponding to the escape of one photon (1-escape), and one at $E_\gamma$ (full energy), corresponding to the escape of neither photon.

The scattered gamma ray following a Compton event may itself interact within the detector. And following a pair-production event, the position may annihilate with an electron producing two quanta of 511 kev.; one or both of these photons may then interact within the detector. Whatever the order of events, if all of the energy of the incident gamma ray is deposited in the active volume of the detector, then a signal will be obtained which contributes to the full energy peak in the pulse-height spectrum. This peak is generally referred to as the "photopeak," but multiple processes may contribute as much as or more than the photoelectric effect to the full-energy peak. The size and geometry of the detector, as well as the energy of the incident gamma ray, play an important role in determining the number of events which appear in the full-energy peak for a given incident flux. This number relative to all other events is what the user generally wishes to maximize.

In the study and analysis of the gamma radiation from various sources of such radiation, one finds gamma rays of various energies and intensities. Because the resulting pulse height spectrum from a single gamma ray is itself complex, the resulting spectrum from a source of many gamma rays is even more complex. Thus, the analysis of a spectrum of many gamma rays is often difficult and ambiguous. Ideally, one would like to use a device which would yield a single peak corresponding to a single energy gamma ray.

Since the Compton scattering of an incident gamma photon tends to produce a continum of pulse height and concomitant "Compton edges," it is this phenomenon giving rise to an undersirable background which makes it difficult to distinguish the desired peaks when a range of gamma ray energies is incident on the detector.

Techniques and devices to enhance the full-energy peak over the unwanted Compton continuum exist in the literature. These techniques depend upon using a detector (originally an NaI—thallium activated—scintillation crystal or more recently a germanium solid state detector) surrounded by an annulus of some scintillating material (liquid or plastic scintillator or NaI(Tl) Crystal). When a Compton scattering event takes place within the more or less centrally located detector, there is some probability that the scattered gamma ray will interact with the annulus of scintillating material and produce a large enough signal (at the output of a photomultiplier tube) to trigger an electronic circuit which will prevent that event from being recorded in the spectrum as obtained by the centrally located detector. Such a system is generally referred to as an anti-Compton spectrometer. [See, for example, P. R. Bell, Science, 120, 625 (1954) and C. C. Trail and S. Raboy, Rev. Sci. Instru., 30, 425 (1959)]. Some disadvantages of this system are as follows: There is a probability that the scattered event will not interact with the surrounding annulus. Also, some interactions may not afford a large enough signal to reject the Compton event from the spectrum. Typically, for a large NaI annulus, 5% of the scattered gamma rays escape through the ends of the annulus. Thus, for such a rejection scheme there is still at least 5% of the unwanted background which can interfere with the measurement of weak intensity gamma rays in the spectrum under investigation. In addition, since the pulse height distribution of the Compton background is related to the direction of the scattered gamma rays, there remains preferentially some of the higher energy Compton events which correspond to scattered gamma rays which escape out of the ends of the annulus. This leaves the appearance of an unwanted small peak in the remaining spectrum.

Other configurations of detectors exist which are used in a coincidence mode. These, however, are basically limited to scintillation type devices. One is the "Three Element Triple Coincidence Compton Spectrometer" of Bonner et al., U.S. Pat. No. 2,992,331, which describes a system for measuring gamma radiation in the pressure of a neutron flux. This system essentially comprises three scintillation crystals and is not a high resolution spectroscopy instrument. Another schemer is to use a modification of the system described in RSI, 30, 425 (1959) in a coincidence made to detect pair production events which occur in the centrally located detector, which give rise to annihilation radiation which is then detected in the scintillating annulus. This system is of course limted in use to the investigation of gamma rays whose energies are greater than 1 mev. where "pair production" is possible.

Another system for eliminating unwanted Compton background from the gamma ray spectrum is described in Wakefield et al., U.S. Pat. No. 3,291,992. This system is limited to a "pair of semiconductor radiation detectors having different atomic numbers and sensitive regions of different thicknesses." This system yields a final spectrum by, inter alia, recording the spectrum obtained from silicon detector and from a germanium detector, and then subtracting the former from the latter. This requires effectively doing each experiment twice to provide both sets of data—one to be subtracted from the other, i.e., half the time data is recorded from the silicon detector and half the time it is recorded from the germanium detector.

SUMMARY OF THE INVENTION

Accordingly, a principal object of the present invention is that of markedly reducing the Compton scattering continuum and virtually eliminating Compton edges and thus provide an improved radiation detector, system and method of detecting gamma photons.

Another object of the invention is that of providing for the enhancement of desired events attributable to the interaction of gamma radiation with matter over unwanted such events.

A still further object of the present invention is that of providing for the enhancement of monoenergetic events over Compton events.

Yet another object is that of permitting the observation of certain Compton events to the exclusion of others.

Another object is that of permitting analysis of a spectrum that would otherwise be difficult, ambiguous or impossible.

Briefly summarized, the present invention features apparatus, system and method comprising or utilizing the combination of a plurality of solid state radiation detectors with or adaptable to an electronic system such that only gamma rays which have deposited their energy in the active volume of the detector, per se, by multiple processes are permitted to be recorded as ultimate data. Moreover, substantially all of the energy of the incident gamma rays must additionally be deposited within said active volume of the detector, per se.

The instant invention also necessarily depends upon a coincidence system, as opposed to an anti-coincidence system. By way of contrast, an anti-coincidence system tends to reject a portion of the unwanted background or continuum, but always with same remaining. A coincidence system, on the other hand, tends to accept desired events only. As a consequence thereof, according to the present invention the height of a given peak relative to background or continuum is inherently higher, thus allowing very weak gamma rays to be detected in the presence of intense gamma rays.

More specifically, this invention utilizes a plurality of solid state radiation detectors preferably of the same material, generally two detectors, preferably Ge(Li) detectors and preferably embodied within a single crystal of germanium. As an alternative to germanium there is mentioned silicon.

To illustrate one preferred embodiment of the invention, an N-I-P-I-N structure in a single crystal of germanium was manufactured by taking a single crystal of P-type (gallium doped) germanium (purchased from Sylvania Electric Products, Inc., Towanda, Pa.) and then simultaneously lithium drifting the same in known manner from two parallel surfaces of the initial crystal toward the center thereof, thus creating an N-I-P-I-N structure.

The single crystal N-I-P-I-N structure thus prepared was then conventionally mounted within a cryostat with the P-region thereof being grounded to the cryostat itself and the two N-regions individually adapted to be connected to the coincidence circuitry. Connection of the said N-regions individually was thence made such that the two resultant distinct N-I-P junctions of the single crystal functioned, each as a separate and distinct detector with respect to the other, and with the circuitry being such that the two N-I-P junctions or structures were connected in coincidence. In this illustration, it is obvious, the original N-I-P-I-N structure having been electronically divided into two distinct N-I-P structures, that the respective P-regions are one and the same. In other words, there is a common P-region by reason of the grounding, albeit there exist two separate and distinct "sub-detectors" each comprising an N-I-P structure. Thus, the overall crystal can still be designated as an N-I-P-I-N structure.

The system was then maintained and operated near liquid nitrogen temperature and gamma radiation was allowed to impinge upon the device perpendicular to a plane defined by one of the N faces, said gamma radiation entering through an aluminum wall defining a portion of the vacuum jacket of the cryostat and housing the crystal.

The signals from each N-I-P structure were separately observed and amplified and normalized. Signals which were in coincidence as defined by the coincidence circuit were added in amplitude and then sorted according to pulse height by a pulse height analyzer.

Thus, substantially only those events corresponding to a single gamma ray depositing part of its energy in the first N-I-P detector and the remainder of its energy in the second P-I-N detector, or vice-versa, i.e., only multiple process events, are permitted to be recorded as ultimate data.

These final data yield a spectrum with full energy peaks greatly enhanced relative to the Compton continuum. This spectrum clearly illustrates that according to the present invention Compton backgrounds are so greatly and markedly reduced that weak intensity gamma rays may be more readily observed in the midst of a complex spectrum and that Compton edges are virtually eliminated, i.e., a spectrum displaying a bare minimum of background continuum, which continuum is additionally basically featureless or smooth.

Moreover, it is abundantly clear that one need not necessarily employ a single crystal N-I-P-I-N structure to obtain the advantages attendant the present contribution, viz., two crystals, each of which being a separate N-I-P structure, could obviously be conveniently mounted together within the same cryostat and connected in coincidence such as to define an equivalent system. In this latter instance, the two N-I-P crystals could be mounted either to define an overall N-I-P-P-I-N (N-I-P-I-N) structure simply by physically dispoing one crystal against the other, or to define an overall N-I-P-N-I-P structure by the same means, except that in this case insulation means would have to be interposed between the central P- and N-regions for obvious reasons.

Further, the present invention is not limited merely to two distinct detectors in coincidence, either on a single crystal or separate crystals, but rather the same may take the form of a plurality of separate and distinct detectors greater than two, for example, an array of Ge(Li) detectors with various pairs thereof connected in coincidence. Either a plurality of single crystal N-I-P structures may make up the above array, or a plurality of single crystals containing more than one N-I-P structure may be employed, or a combination of these.

Furthermore, and since the present invention is of course characterized by a system such that only gamma rays which lose energy by multiple processes are permitted to be recorded as ultimate data (and more precisely by a system such that only gamma rays which lose energy by multiple processes with a portion of this energy being deposited in one detector and the remainder in a second detector in coincidence therewith are permitted to be recorded as ultimate data), it becomes apparent that the physical spatial relationship or close proximity between the individual detectors in coincidence mode must be such as to foster or maximize entry in and interaction with the active volume of one detector of a "scattered" photon after the initial collision of the incident gamma ray and its partial loss of energy in and exit from the active volume of the other as such a scattered photon. For purposes of simplicity and convenience, this physical spatial relationship between the component detectors shall hereinafter and in the claims be referred to merely as the "multiple process mutual scatter accepting" relationship. Consequently, it also becomes apparent, for example, in the above two crystal embodiment, each of which being a separate N-I-P structure, that it is not necessary for both of the crystals to be mounted in the same cryostat, but rather the same may be mounted in different cryostats, so long as the cryostats (and consequently the detectors) can be moved or positioned close enough together to effect the multiple process mutual scatter accepting relationship.

The hereinbefore mentioned and other features and objects of the present invention and the manner of attaining the same will become more apparent and the invention itself will be best understood by reference to the following description of several embodiments of the invention taken in conjunction with the accompanying several figures of the drawing, which figures illustrate the best modes presently contemplated for carrying out the objects of the invention and its principles, and are not to be construed as restrictions or limitations on its scope or as in any way precluding the substitution of one noncritical equivalent member for another, and further wherein like reference numerals are used to indicate like or equivalent parts.

DESCRIPTION OF THE PREFERRED EMBODIMENTS

Representative crystal structures

Figure 1:
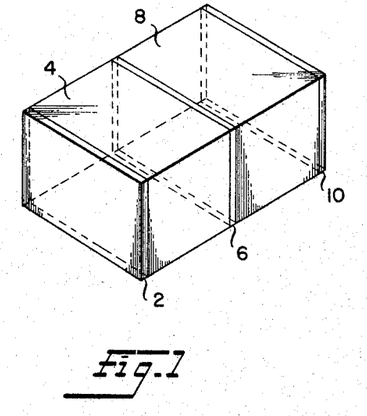
FIG. 1 is an isometric view of the preferred single crystal N-I-P-I-N structure utilized in the invention.

Referring first to FIG. 1, a first semiconductor single crystal N–I–P–I–N structure is seen having a first N-type layer 2, a relatively large substantially intrinsic zone 4, an ideally small P-type layer 6, a second substantially intrinsic zone 8 and a final N-type layer 10. This and the subsequently described crystals are preferably of the lithium "drifted" germanium variety.

Figure 1A:
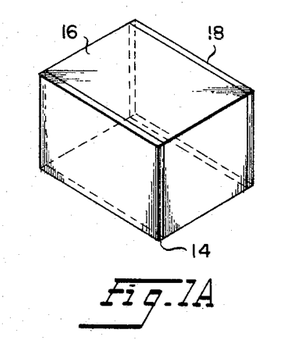
FIG. 1a is an isometric view of a single crystal N-I-P structure which may form a part of the composite solid state radiation detector of the invention.

FIG. 1a illustrates a single crystal N–I–P structure similar to half of that of FIG. 1 having an N-type layer 14, a substantially intrinsic zone 16 and a P-type layer 18.

Figure 1B:
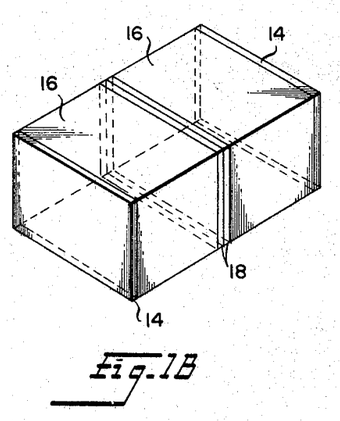
FIG. 1b is an isometric view of two crystals of FIG. 1a placed together thus providing a structure equivalent to that of FIG. 1.

FIG. 1b shows two of the elements of FIG. 1a placed side-by-side, i.e., a structure equivalent to that of FIG. 1.

Figure 2:
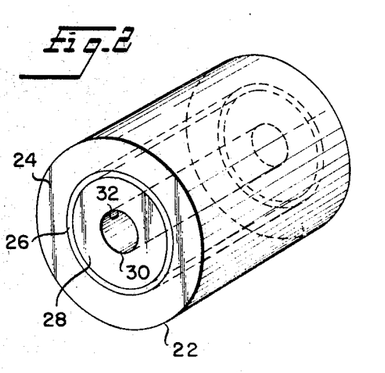
FIG. 2 is another embodiment of the invention illustrating a hollow concentric type crystal.

FIG. 2 displays a hollow crystal having an outer thin N-type layer 22, a concentric substantially intrinsic zone 24, an intermediate P-type layer 26, an inner substantially intrinsic zone 28, and an N-type layer 30, with the center of the crystal being a hollow bore 32.

Figure 3:
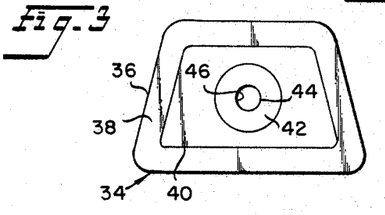
FIG. 3 is an embodiment illustrating a trapezoidally shaped crystal which may alternatively be used in the invention.

FIG. 3 is a trapezoidally shaped crystal 34 having an outer N-type layer 36, a similarly shaped intrinsic zone 38, a subsequent P-type layer 40, another intrinsic zone 42 followed by a final N-type layer 44 surrounding a hollow bore 46.

Figure 3A:
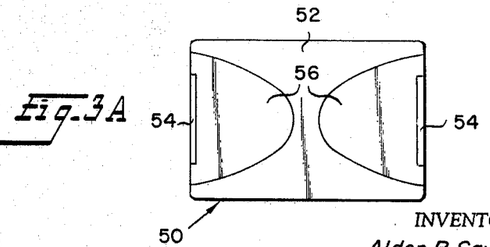
FIG. 3a shows an integrated block type crystal which forms another embodiment of the invention.

FIG. 3a illustrates a block 50 of P-type material 52 having intrinsic zones 56 formed therein. Each of these zones 56 has a small N-type 54 layer doped on the surface. The advantage of this type device will be appreciated in that, as seen below, the base of P-type material 52 can be placed directly on the cryostat structure thus grounding the same without the need for further electrical connections.

Ideally it is a desideratum to have the "I" regions make up as much as possible of the actual volume of the detector, with the "N" and the "P" regions being of minimum thickness, but these are not critical parameters of the subject contribution and the thicknesses of the various regions may vary over wide limits. A very desirable N–I–P–I–N structure would be one wherein the "I" regions are in the order of 100 times as thick as the "N" or "P" regions, with the said "N" and "P" regions being of approximately equal thickness, but structures wherein the "I" regions are only 6 or less times as thick as the "N" regions and approximately equal in thickness to the "P" region are also quite acceptable.

Cryostat structure

Figures 4, 5, 6:
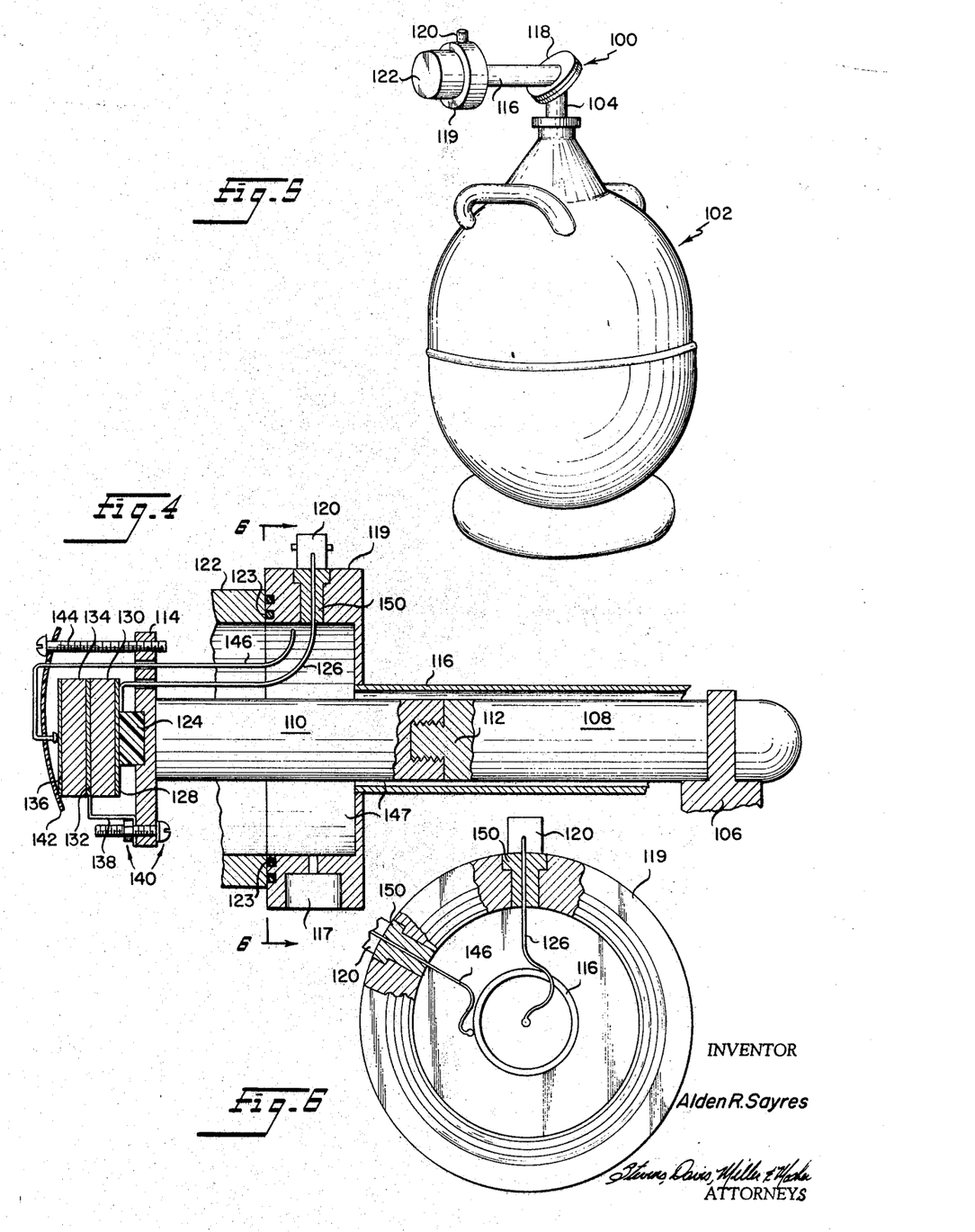
FIG. 4 is a cross-sectional view through a portion of a cryostat that may be employed in the invention.
FIG. 5 is a side elevational view of the cryostat in a Dewar.
FIG. 6 is a partial cross-sectional view of the connector assembly in FIG. 4 taken along line 6—6.

FIGS. 4 and 5 illustrate a cryostat generally indicated at 100 placed in a Dewar 102 (FIG. 5) of liquid nitrogen (Union Carbide's Linde LD–25 model). The cryostat has a sheath or sleeve portion 104 which fits within the Dewar and contains a copper cold finger 106 which extends down into the liquid nitrogen. Forming a right angle, which may be soldered to the cold finger, is a copper member 108. This copper member is shown in FIG. 4 threadably inserted into an aluminum member 110 at point 112.

Secured to the member 110 is a cross piece 114 which supports the various components, as will be discussed below. This cross member 114 is also preferably constructed of aluminum material.

Connected to the sleeve member 104 is a substantially horizontal sleeve member 116 which forms a right angle with the sleeve 104 at a point 118 in the form of a 45° angle connector. The horizontal sleeve 116 contains the members 108 and 110. Secured thereto is a support for the connectors and preamplifiers to be discussed below. Also provided on sleeve 116 are valve means 117 for evacuating the chamber. A housing at the end of the horizontal member 116 is designated by numeral 119. A pair of connectors 120 (only one of which is shown in FIGS. 4 and 5, see FIG. 6) is suitably secured to the housing 119. On the face of the housing is an end cap 122 which may be made of 0.020 inch thick aluminum, at least the front face being of this preferred thickness. The end cap may be hermetically secured in a conventional manner using O-rings 123 for proper sealing purposes.

Secured to the aluminum cross member is an electrical insulator and thermal conductor 124 which may be of such material as sapphire or material sold under the trade name of "Lucalux" by the General Electric Company.

One of the connectors 120 is connected by a line 126. The line 126 connects the connector 120 to the point of contact on an N-type germanium portion 128 of the crystal to be discussed further. The connection line 126 will pass through a piece of insulation 150 (see FIG. 6) to protect it both electrically and thermally from the surroundings and may also include a Teflon sleeve for protection.

As discussed above, the crystal itself contains a first end having an N-type germanium layer 136. The P-type and N-type layers are preferably quite thin in relation to the substantially intrinsic zones 130 and 134. As previously discussed, multiple crystals may be utilized instead of the N–I–P–I–N crystal.

An electrical connection 138 is electrically connected to a ground or fixed potential on the cross piece 114 by means of a suitable nut and bolt arrangement 140. In other words, the P-layer is connected to the cryostat structure itself.

In order to hold the crystal in place, a spring type material 142 which may be of Teflon sheet held by screws 144 will provide a rigid structure. This obviously will keep the crystal detector insulated from those portions which are connected to various higher potentials.

Another electrical connection 146 is connected to the other of the electrical connectors 120. This in turn is connected to the N-layer 136.

The operation of the cryostat is similar to that of the prior art and will be best understood in the discussion of the crystal, per se, and the electrical circuitry to follow. In operation, vacuum space 147 has been evacuated, and cold is conducted from the liquid nitrogen reservoir to the detector crystal via members 106, 108, 110 and 124.

FIG. 6 discloses a cross-sectional view of the cryostat wall and the sealing means where, for example, lines 126 and 146 disclose the connectors to the outside and means for insuring hermetic sealing are shown at 150.

Electronic read out circuitry

Figure 7:
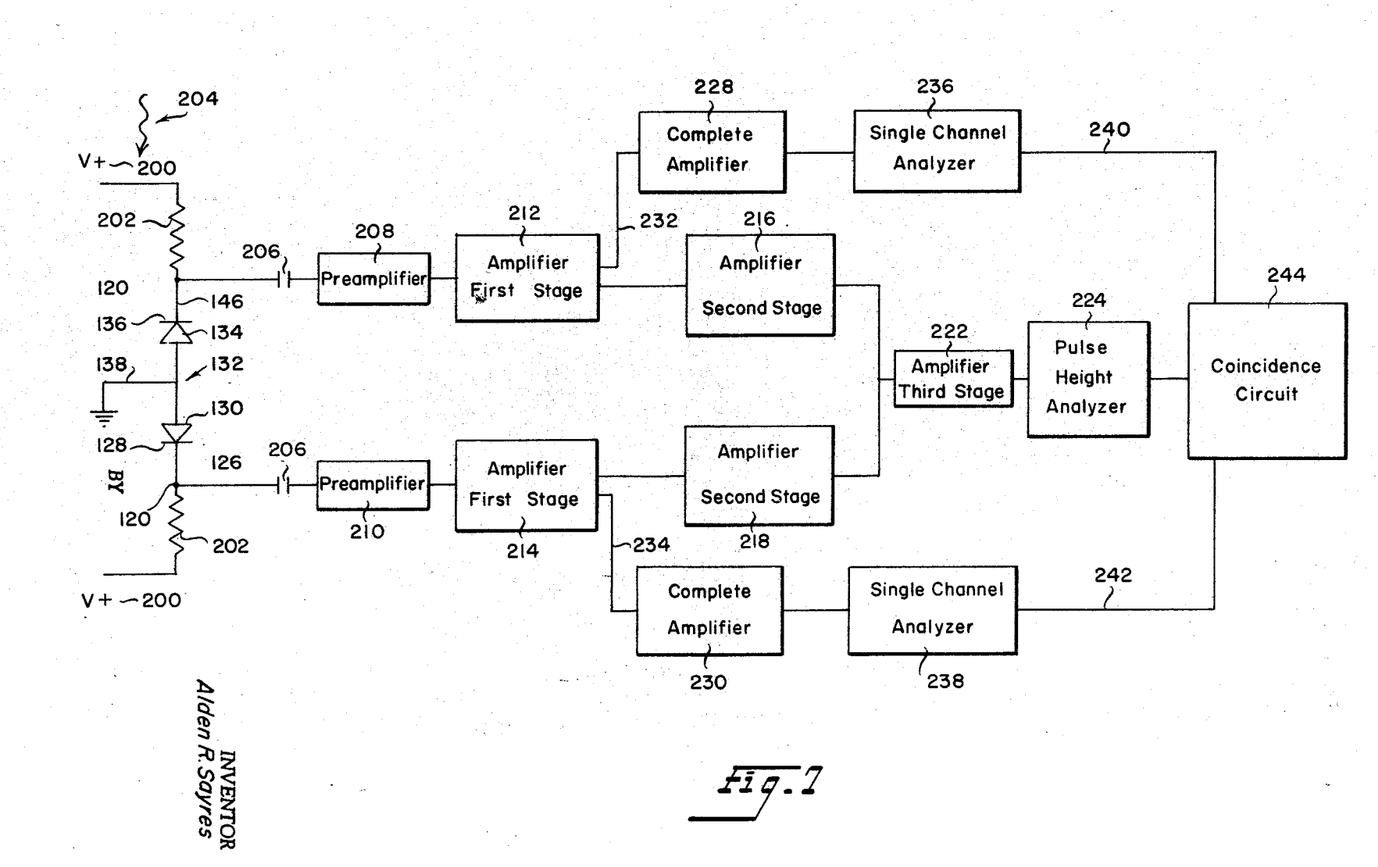
FIG. 7 is a schematic view of the device and associated electrical circuitry.

The crystal of the instant invention is shown schematically on the lefthand portion of FIG. 7 utilizing the same numbers as in the crystal shown in the cryostat structure, per se.

As can be seen the P-type material is connected to a ground or fixed potential through line 138. Each of the N-type zones are connected to sources of positive or biasing potential 200 through resistances 202 at the connection points 120 (also numbered in accordance with that of the cryostat structure, per se).

As can be seen from the drawing, the gamma radiation is indicated diagrammatically as impinging upon the crystal at 204.

The connectors 120 are connected through a respective pair of coupling capacitors 206 to preamplifiers 208 and 210. These preamplifiers, one being termed the top preamplifier and the other, which is connected to the bottom of the crystal, being termed the bottom preamplifier, are preferably of the FET type. In other words, the signals from the detector pass through a preamplifier stage containing at least one field effect transistor in its circuitry. Even more preferably, the FET preamplifiers are themselves disposed within the detector vacuum space closely adjacent the detector and are cooled by the same liquid nitrogen reservoir servicing said detector. Such an arrangement wherein the preamplifiers are adapted to be readily serviced or replaced without breaking the detector vacuum space is discussed in Baicker and Sayres copending application, Ser. No. PGT–100, filed July 21, 1967 and entitled Low Temperature System.

As the gamma radiation penetrates the crystals, signals are generated, as discussed above in regard to the crystal structure and operation, separately through the respective output lines to the preamplifiers. These preamplifiers should be as close as possible to the crystal structure to avoid loss in the energy resolution capabilities of the system. The signals from the preamplifiers 208 and 210 are fed respectively into first stages of a plurality of amplifiers 212 and 214. One output from each amplifier 212 and 214 is fed into the second stages of respective amplifiers 216 and 218. The output of these amplifiers 216 and 218 converge at point 220 and are utilized as the external input into a third stage amplifier 222, which will in effect add the two signals.

The output of the third stage of the amplifier 222 is fed into a conventional pulse height analyzer 224 through a line 226.

It should be noted at this point that the output of the amplifiers 216 and 218 are adjusted empirically such that the pulses corresponding to the same amount of energy deposited in each of the detector sections will fall in the same memory location of the pulse height analyzer. Therefore, when pulses corresponding to a single gamma ray depositing part of its energy in one of the two detectors and the rest of its energy in the second are added, the resulting pulse will be stored in the same memory location as if all the energy had been deposited in a single detector.

Complete amplifiers 228 and 230 are fed from the first stage amplifiers 212 and 214 by lines 232 and 234 respectively.

These amplifiers in turn feed into single channel analyzers in integral mode 236 and 238. These may be referred to as NC–14A Low-Jitter Pulse Height Analyzers commercially available from Hamner Electronics. These single channel analyzers are set above a particularly selected noise level and may be used as discriminator type circuits to receive inputs within or above a certain level. They may also be used in the differential mode, if desired.

The outputs 240 and 242 of the single channel analyzers are in turn fed into a coincidence circuit 244. This may also be obtained from the above supplier under the designation NL–16A Fast Ramp Coincidence Module.

The threshold levels of the analyzers 236 and 238 may be adjusted for illustrative data receiving purposes to accept amplitude pulses from both the top detector and also somewhat higher pulse amplitude from the bottom detector to preferentially choose events which deposited most of their energy in the bottom detector. The threshold levels of the single channel analyzers can also be adjusted to optimize empirically the full energy peak to background ratios as is appropriate for a particular experiment.

The coincidence circuit then provides the gating input for the pulse height analyzer 224.

Operation and characteristics of the electrical circuitry

It is the function of the preamplifiers stages 208 and 210 to integrate the current emanating from the detector and to provide a low impedance driver to a main amplifier. The instant preamplifier, particularly being located very closely adjacent to the detector, integrates the detector current and has very low noise charge-sensitive characteristics in that the equivalent noise output has zero capacitance and a closely ideal slope of noise vs. input capacitance. Therefore, it should be attempted to minimize the non-detector associated capacitance at the preamplifier input.

The above considerations are most important for low-energy gamma radiation because the statistical contribution to noise is relatively small and the preamplifier dominates. Because the capacitance must be kept low, the bias resistance 202 should be kept sufficiently large so that the noise spectrum is integrated over a long time, thus shifting the noise toward the low frequencies. The detector is operated for example at one nanoampere, or less and bias resistors as large as 2,000 megohms may be used.

Careful selection and matching of the field effect transistors can bring about marked improvement in the performance of the system. As the capacitance of the detector is increased, the use of three or four field effect transistors may result in the optimum resolution. Generally, the zero capacitance noise increases as the number of FET's is increased, but the noise at high capacitance may be decreased.

It is the function of the pulse height analyzer to sort incoming pulses into one of many narrow continuous channels. The analyzer should provide at least four or five channels per resolution width of any peak of interest if no degradation of resolution is to take place. This implies channel widths of 0.5–1 kev. and, hence, a requirement for very many channels if the gamma energy is not very low. The large number of channels places quite stringent requirements on the stability of the analyzer as well as on the entire system. The instant analyzer utilizes 400 channels with at least 1600 channel expansion capabilities.

As discussed above, the crystal will measure the coincidence of the gamma radiation in each of its two sections by means of first detecting the respective outputs on the preamplifiers 208 and 210 and feeding them through amplifier circuits discussed above and if the coincidence circuit is triggered, the gate pulse feeding the coincidence circuit 244 to the pulse height analyzer 224 will be initiated.

More specifically, a more or less continuous train of signals will be fed from the third stage of the amplifier 222 into the pulse height analyzer 224 through line 226. However, in order for a signal to be recorded on analyzer 224; coincidental pulses must appear from the single channel analyzers 236, 238 through outputs 240, 242 on the coincidence circuit 244. The signal from the coincidence circuit 24 will in turn gate on the pulse height analyzer and a reading from amplifier 222 will appear. This is one particular embodiment to obtain the "coincidence" measurement of events in the crystal as opposed to prior art "anti-coincidence" measurement systems.

The above has discussed in rather detailed terms how gamma radiation is detercted utilizing the twin or double detector crystal. Namely, the events are picked up and respectively (1) preamplified, (2) amplified, (3) one portion further amplified, (4) added and fed into a pulse height analyzer which is gated into operating condition if events occur coincidentally in both detectors.

However, it would often be desirable to utilize the device as a single detector or as two single detectors, as opposed to employing an entirely new cryostat system. Therefore, several possible means may be employed to convert the instant coincidence detector into, e.g., a single detector.

First, the gating circuit can be disconnected, thereby having all the signals recorded on the pulse height analyzer.

Secondly, a more preferable means of utilizing an existing read-out circuit would be to join connectors 120 together and disconnect one of the preamplifiers and hence succeeding circuits in a particular train of amplifier stages, etc.

A third alternative would be to cut off the gate requirement and one preamplifier.

Obviously, various other means may be employed to easily convert the double detector into a single detector or two single detectors without the expense of utilizing another cryostat device or altering the existing internal structure of the one described above.

Graphical representations

Figure 8:
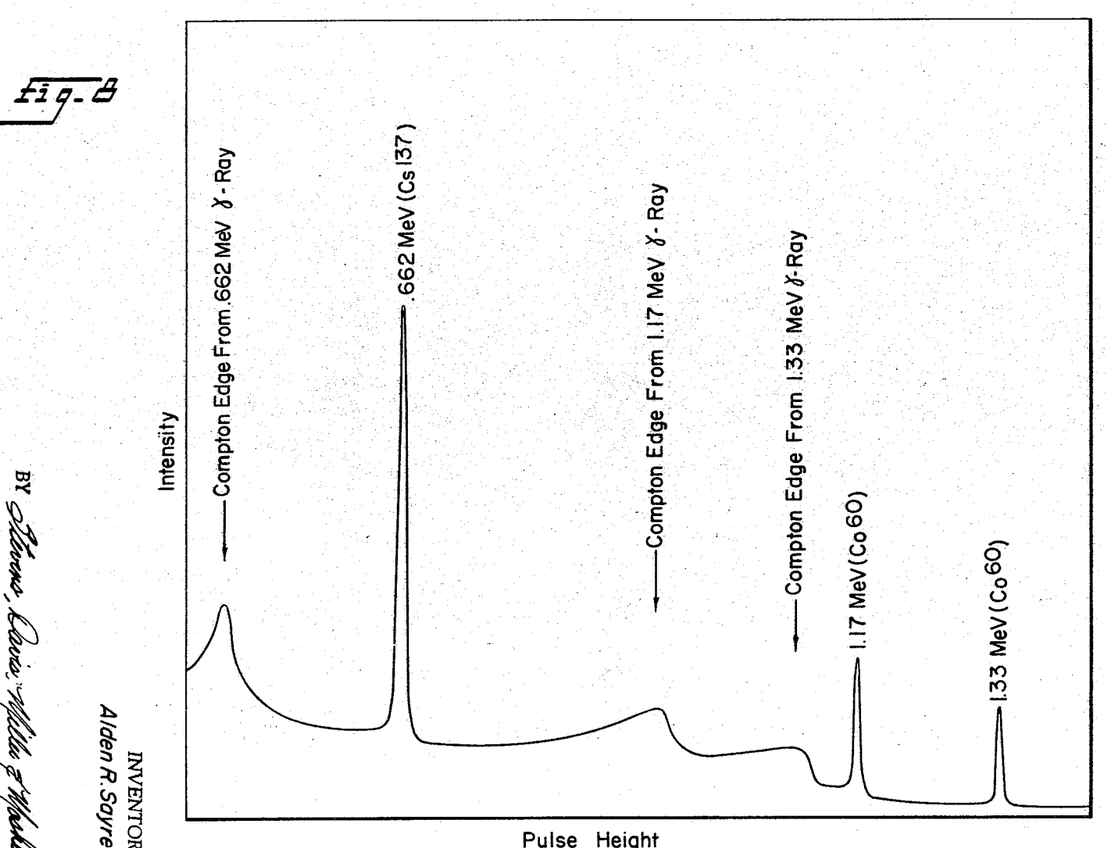
FIGS. 8–11 are graphs comparing various results illustrating the Compton effect obtained with and without the use of the instant invention.
Figure 9:
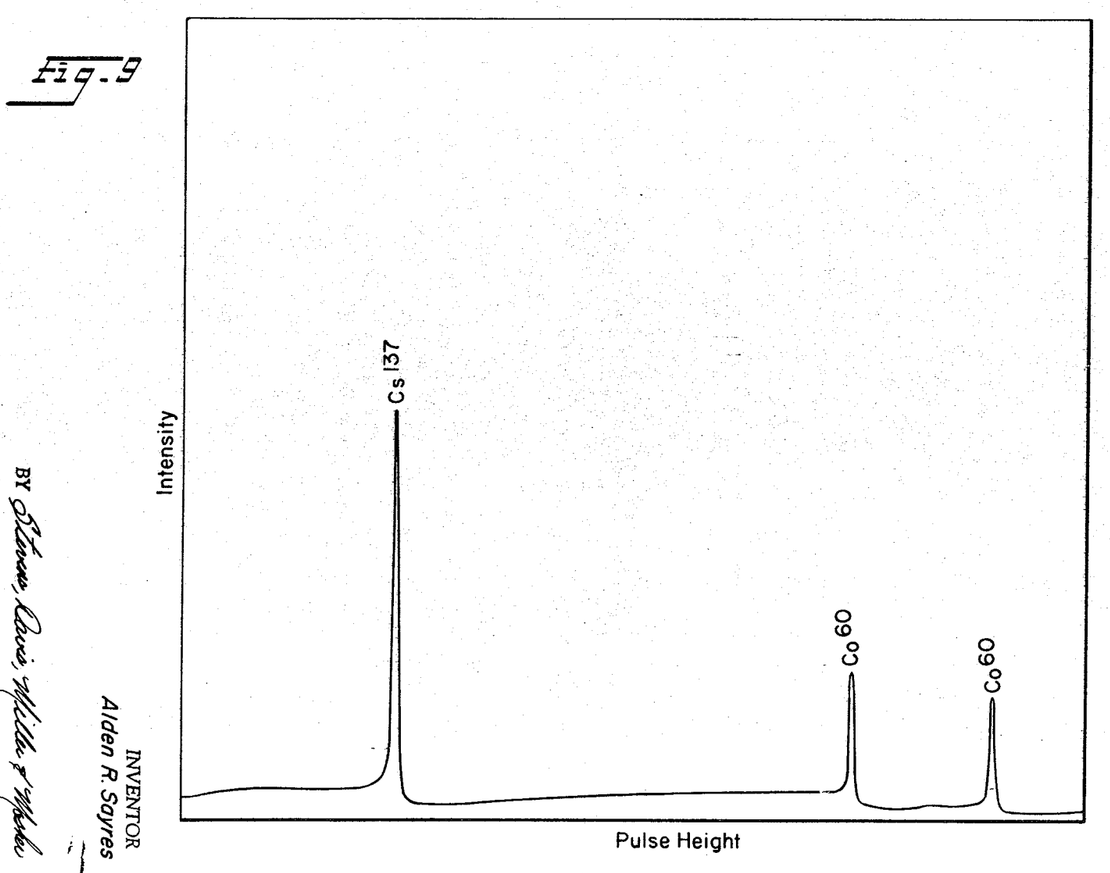

Using a $Cs^{137}$ source of .662 mev. gamma rays and a $Co^6$ source of 1.17 and 1.33 mev. gamma rays simultaneously, the spectrum of FIG. 8 was obtained when no coincidence between the two detectors was required. This spectrum is as would be obtained from a conventional Ge(Li) detector. In the coincidence mode (as per the present invention) the spectrum of FIG. 9 was obtained. Clearly, the Compton edges as indicated in FIG 8 are absent in the data obtained when using this present invention.

Figure 10:
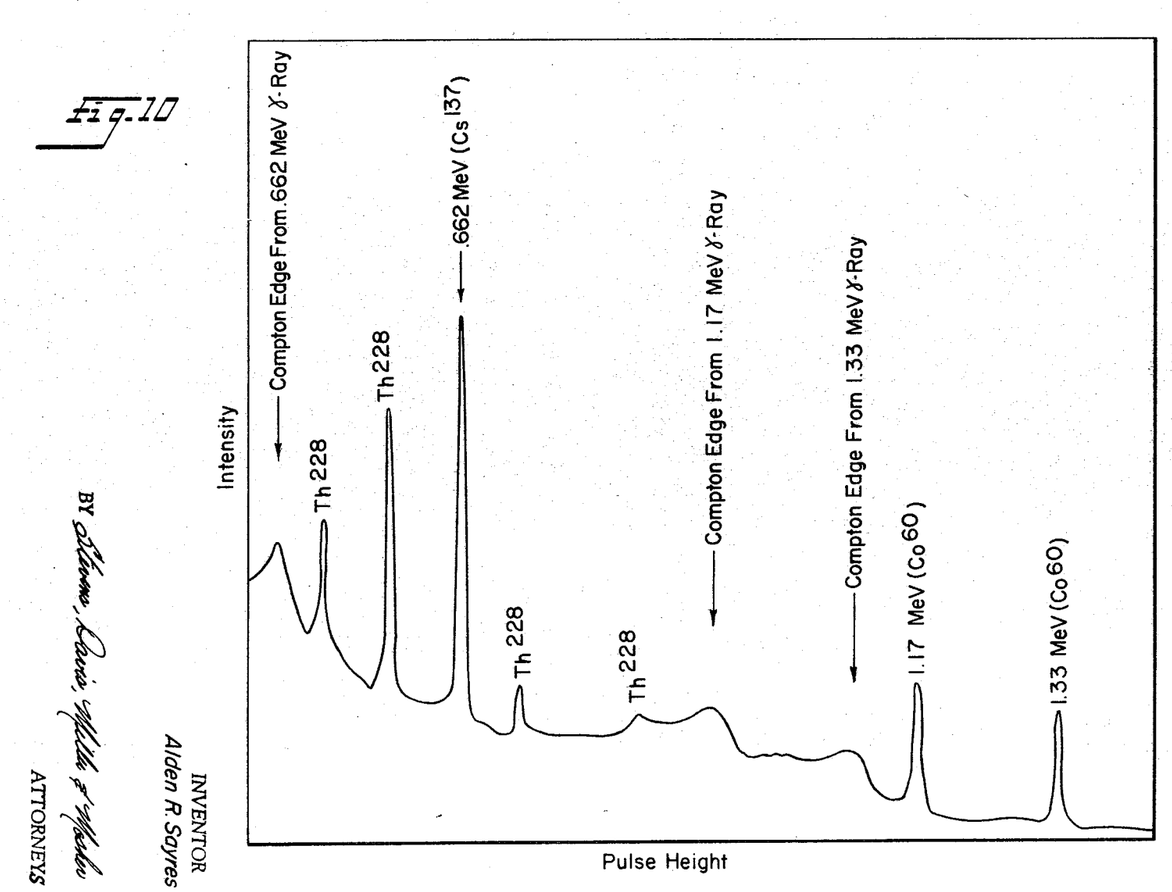
Figure 11:
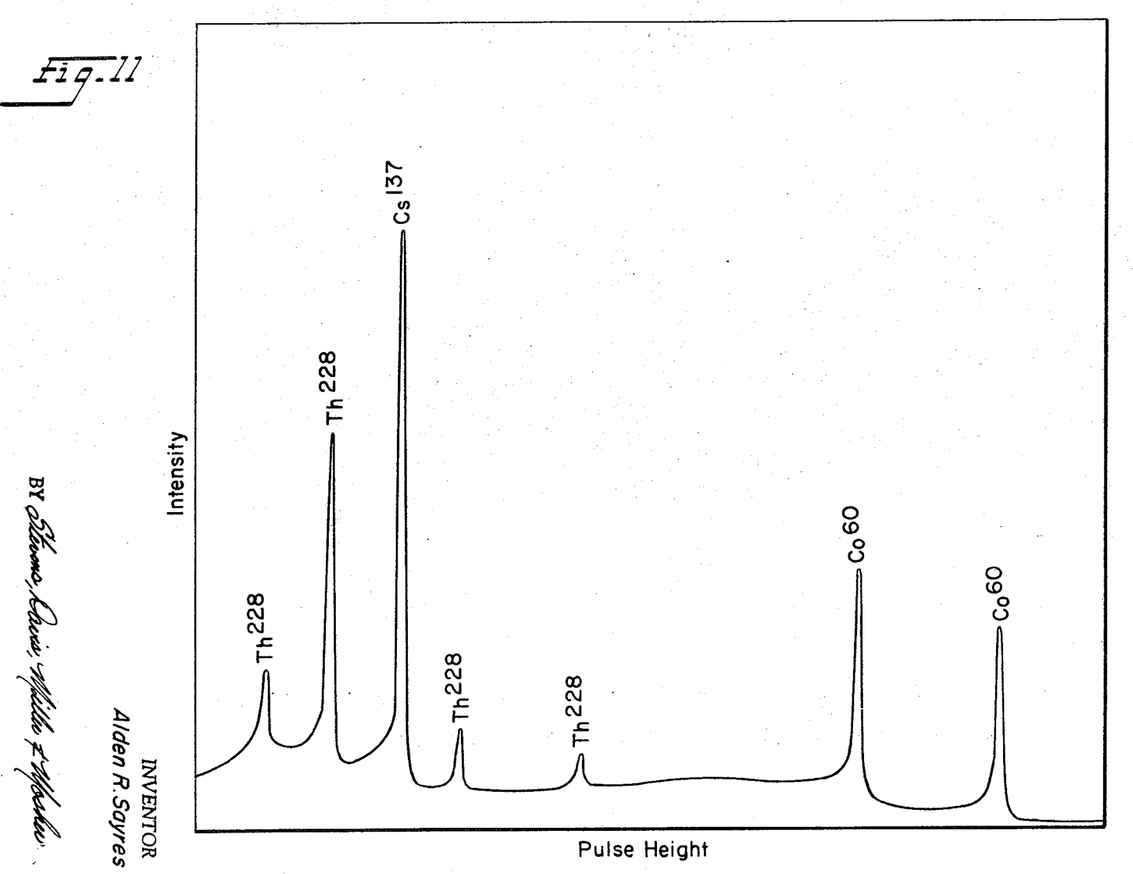

To further illustrate the performance of the present invention, a Thorium-228 source which has many gamma rays was added to the previously named sources. The spectrum (in the same energy region of FIGS. 8 and 9) was obtained with no coincidence required. This is as would be obtained using a conventional Ge(Li) detector. These data are shown in FIG. 10. Using the present invention, the spectrum of FIG. 11 was obtained. This spectrum clearly illustrates that when using the present invention, spectra are obtained such that Compton edges are eliminated and backgrounds are so greatly reduced that weak-intensity gamma rays may be more readily observed in the midst of a complex spectrum.

As many apparently different embodiments of this invention may be made without departing from the spirit and scope thereof, it is to be understood that the same is not to be limited to the specific embodiments thereof, except as claimed in the appended claims.

What is claimed is:

1. A method for detecting gamma radiation, comprising exposing to a source or suspected source of gamma radiation a pair of semiconductor radiation detectors in multiple process mutual scatter accepting relationship, and selectively detecting substantially only those electrical pulses corresponding to a single gamma ray depositing part of its energy in one detector and remaining energy in another.

2. The method as defined by claim 1, each of said detectors having a P-N junction and a substantially intrinsic zone.

3. The method as defined by claim 2 for detecting and measuring gamma radiation, comprising exposing to a source or suspected source of gamma radiation a pair of semiconductor radiation detectors in multiple process mutual scatter accepting relationship, each of said detectors having a P-N junction and a substantially intrinsic zone, and selectively detecting and measuring by operating said pair of detectors in coincidence mode substantially only those electrical pulses corresponding to a single gamma ray depositing part of its energy in one detector and remaining energy in another.

4. The method as defined by claim 3, wherein the substantially intrinsic zones are lithium compensated.

5. The method as defined by claim 3, wherein the pair of detectors are embodied within a single crystal of germanium, said crystal exhibiting an N-I-P-I-N structure.

6. The method as defined by claim 3, wherein said selective detecting and measuring are effected by separately observing, amplifying and normalizing each detector output, and thence adding in amplitude signals in coincidence and sorting the same according to pulse height.

7. Semiconductor radiation detection apparatus, comprising a pair of semiconductor radiation detectors in multiple process mutual scatter accepting relationship, each of said detectors having a P-N junction and a substantially intrinsic zone, each detector output feeding a separate channel, and means for connecting each of said detector outputs in coincidence mode.

8. The apparatus as defined by claim 7, further comprising means for sorting signals in coincidence according to pulse height.

9. The apparatus as defined by claim 7, disposed within at least one cryostat.

10. The apparatus as defined by claim 9, wherein the at least one cryostat is disposed within a Dewar.

11. The apparatus as defined by claim 7, wherein the means for connecting each of said detector outputs in coincidence mode comprise a system of preamplifiers, amplifiers, single-channel analyzers and a coincidence circuit.

12. The apparatus as defined by claim 11, further comprising a pulse height analyzer.

13. The apparatus as defined by claim 7, further comprising means for operating the detector in the diode mode.

14. The apparatus as defined by claim 7, wherein the substantially intrinsic zones are lithium compensated.

15. The apparatus as defined by claim 7, wherein the pair of detectors are embodied within a single crystal of germanium, said crystal exhibiting an N-I-P-I-N structure.

16. The apparatus as defined by claim 7, comprising more than two semiconductor radiation detectors.

17. The apparatus as defined by claim 7, wherein the semiconductor radiation detectors are embodied within a concentric type crystal.

18. The apparatus as defined by claim 7, wherein the semiconductor radiation detectors are embodied within a trapezoidally shaped crystal.

References Cited

UNITED STATES PATENTS

| 3,291,992 | 12/1966 | Wakefield et al. | 250—83.3 |
| 2,830,185 | 4/1958 | Scherbatskoy | 250—71.5 |
| 3,131,305 | 4/1964 | Shombert | 250—83.3 |
| 3,180,989 | 4/1965 | Hand et al. | 250—83.3 |
| 2,991,366 | 7/1961 | Salzberg | 250—83.3 |

ARCHIE R. BORCHELT, Primary Examiner

D. L. WILLIS, Assistant Examiner

U.S. Cl. X.R.

250—71.5